(12) United States Patent
Etling

(10) Patent No.: US 7,305,759 B2
(45) Date of Patent: Dec. 11, 2007

(54) DEVICE FOR THE MANUFACTURE OF A SHAFT ASSEMBLY FOR A HYDRODYNAMIC BEARING

(75) Inventor: Carsten Etling, Spaichingen (DE)

(73) Assignee: Minebea Co., Ltd., Miyota-machi (JP)

( * ) Notice: Subject to any disclaimer, the term of this patent is extended or adjusted under 35 U.S.C. 154(b) by 525 days.

(21) Appl. No.: 10/937,800

(22) Filed: Sep. 8, 2004

(65) Prior Publication Data

US 2005/0050721 A1    Mar. 10, 2005

(30) Foreign Application Priority Data

Sep. 10, 2003    (DE) ................................ 103 43 319

(51) Int. Cl.
*B23P 21/00*    (2006.01)
(52) U.S. Cl. .............................. 29/790; 29/446; 29/724; 29/725; 29/525
(58) Field of Classification Search .................. 29/724, 29/725, 790, 446, 525
See application file for complete search history.

(56) References Cited

U.S. PATENT DOCUMENTS 3,673,661 A * 7/1972 Secunda ...................... 29/724
3,837,069 A * 9/1974 Nordgren .................... 29/432.1

FOREIGN PATENT DOCUMENTS

| CH | 483 299 | 12/1969 |
| DE | 282 646 | 9/1990 |
| DE | 94 07 134 | 10/1995 |

OTHER PUBLICATIONS

Annotation of 3673661.*

* cited by examiner

*Primary Examiner*—Rick K Chang
(74) *Attorney, Agent, or Firm*—Lipsitz & McAllister, LLC

(57) ABSTRACT

In order to improve a device for the manufacture of a shaft assembly for a hydrodynamic bearing by pressing a shaft into a fit bore in a bearing disk, comprising a first pressing tool and a further pressing tool, in such a way that enables high accuracy to be achieved when the shaft is pressed into the bearing disk, with the lowest possible cost and effort in setting up the press, it is proposed that a shaft receiving portion which receives and guides the shaft aligned exactly to a central axis is associated with the first pressing tool, that a bearing disk receiving portion which receives and guides the bearing disk with a flat surface aligned exactly perpendicular to an axis is associated with the first pressing tool, and that for the pressfitting process, the first pressing tool acts on the shaft or the bearing disk by means of a first pressing element and a second pressing tool acts on the bearing disk or the shaft by means of a second pressing element.

18 Claims, 3 Drawing Sheets

DEVICE FOR THE MANUFACTURE OF A SHAFT ASSEMBLY FOR A HYDRODYNAMIC BEARING

The present disclosure relates to the subject matter disclosed in German application No. 103 43 319.8 of Sep. 10, 2003, which is incorporated herein by reference in its entirety and for all purposes.

BACKGROUND OF THE INVENTION

The invention relates to a device for the manufacture of a shaft assembly for a hydrodynamic bearing by pressing a shaft into a fit bore in a bearing disk, the device comprising a first pressing tool and a second pressing tool that can be moved towards each other in a feed direction.

In the know manufacturing processes for such shaft assemblies, the shaft is pressed into a fit bore disposed in the center of the bearing disk by means of a first pressing tool accommodating the shaft and a second pressing tool accommodating the bearing disk, the diameter of the fit bore being less than the diameter of the shaft.

Since the strictest requirements are placed on the completed shaft assembly for use in a hydrodynamic bearing regarding the right angularity between a central axis of the shaft and flat surfaces of the bearing disk, the shaft and the bearing disk have to be precisely aligned to each other during the pressfitting process.

To ensure such exact alignment, not only is a highly accurate press required but the pressing tools have also to be aligned to each other with high precision, which means great costs and effort particularly when the pressing tools are exchanged.

The object of the invention is thus to improve a device of this kind in such a way that enables high accuracy to be achieved when the shaft is pressed into the bearing disk with the lowest possible cost and effort in setting up the press.

SUMMARY OF THE INVENTION

This object has been achieved for a device of the type described in the opening paragraphs in accordance with the invention in that a shaft receiving portion which receives and guides the shaft aligned exactly to a central axis is associated with the first pressing tool, that a bearing disk receiving portion which receives and guides the bearing disk with a flat surface aligned exactly perpendicular to an axis is associated with the first pressing tool, that the shaft receiving portion and the bearing disk receiving portion position the shaft and the bearing disk with respect to each other without contact in a starting position and can be movably guided with respect to each other parallel to the axis and can thus be moved from the starting position into a pressfit position, and that for the pressfitting process, the first pressing tool acts on the shaft or the bearing disk by means of a first pressing element and a second pressing tool acts on the bearing disk or the shaft by means of a second pressing element.

The advantage of the solution according to the invention can be seen in that the allocation of the shaft receiving portion and the bearing disk receiving portion to one of the pressing tools and the movement of these two elements with respect to each other parallel to the axis make it possible for the alignment of the shaft and the bearing disk, before pressfitting and also during the pressfitting process, to be made independent of the alignment of the two pressing tools with respect to each other, and further, the allocation of the shaft receiving portion and bearing disk receiving portion to one pressing tool, makes it possible, through the guidance of the shaft receiving portion and the bearing disk receiving portion with respect to each other, to achieve the required precision, which is thus essentially independent of the alignment of the pressing tools with respect to each other.

It is particularly favorable if, during the pressfitting process when the movement from the starting position in the direction of the pressing position begins, only the bearing disk receiving portion and the shaft receiving portion maintain the exact alignment of the shaft and the bearing disk with respect to each other, so that the precision of alignment of the shaft and bearing disk with respect to each other is determined by the guiding precision of the shaft receiving portion and the bearing disk receiving portion with respect to each other.

It is particularly favorable if the bearing disk receiving portion comprises a bearing disk carrier having a support surface against which the bearing disk engages with a first flat surface so that the bearing disk can thus be aligned via the first flat surface.

It is preferably if the bearing disk held in the bearing disk receiving portion is arranged in such a way that a force can be applied to its second flat surface located opposite the first flat surface by the second pressing element of the second pressing tool.

To establish particularly transparent conditions when the bearing disk is aligned, it is preferable if, at least from the start of the process of pressing the shaft into the bearing disk, the first flat surface of the bearing disk is held in close contact with the support surface.

In order to ensure that the first flat surface is fitted securely against the support surface, it is particularly expedient if the support surface is held tightly to the first flat surface by a holding force.

This holding force can be generated in a variety of different ways. It is conceivable, for example, to insert pressure elements acting with the holding force between the bearing disk carrier and the bearing disk.

A holding force acting between the support surface and the flat surface of the bearing disk can be particularly advantageously generated if a holding force acting in the direction of the starting position is exerted on the bearing disk receiving portion and the shaft receiving portion in respect of a relative movement in the direction of the axis and that the holding force works against a direction of conveyance of the pressing elements, so that when the pressing elements are conveyed, a holding force acting between the support surface and the flat surface is always present.

The holding force could be generated by a hydraulic or pneumatic cylinder or by another device.

A particularly simple solution provides for the holding force to be generated by at least one elastic energy or force storage unit.

So far, no precise details have been given concerning the guidance of the shaft receiving portion and the bearing disk receiving portion with respect to each other.

In order to achieve the required high precision, it is favorable if the shaft receiving portion and the bearing disk receiving portion are guided with respect to each other via a linear guide.

It is expedient if the linear guide is supported by rolling element bearings.

A particularly simple solution provides that a guide member carrying the shaft receiving portion forms a guide surface for the linear guide, so that the bearing disk receiving portion can be directly guided via this guide member with respect to the shaft receiving portion.

It is further preferable if an annular member carrying the bearing disk receiving portion encloses the guide member and has a second guide surface facing the first guide surface.

So far, no precise details have been given concerning the centering of the bearing disk with respect to the central axis of the shaft. In principle, it is conceivable to construct the bearing disk receiving portion in such a way that allows the bearing disk to center itself when the pressfit end is pressed into the fit bore.

A particularly simple construction is provided, however, if the bearing disk receiving portion centers the bearing disk precisely to the axis.

For this purpose, the bearing disk receiving portion is preferably provided with an aligning element that holds the bearing disk centered with respect to the axis.

Such an aligning element could, for example, accommodate the bearing disk as a whole. A particularly favorable solution provides for the aligning element to engage an outer surface of the bearing disk in order to center it with respect to the central axis. Engaging the outer surface of the bearing disk in this way makes it possible to arrange the bearing disk in such a way that its second flat surface facing the second pressing tool is freely exposed for the second pressing tool to act on it.

Concerning the securing of the aligning element, it is particularly favorable if it is secured to the bearing disk carrier and thus establishes the guiding precision of the bearing disk carrier with respect to the shaft receiving portion and at the same time the precision for centering the bearing disk with respect to the central axis of the shaft.

The aligning element is preferably formed in such a way that it is secured to the bearing disk carrier in a positive fit.

Since the device according to the invention is extremely sensitive to any kind of soiling, including soiling caused by the smallest particles, it is preferable if the aligning element can be removed from the bearing disk carrier so that both the bearing disk carrier and the aligning element can be easily cleaned.

Since in the solution according to the invention, the overall guiding precision of the shaft and the bearing disk during the pressfitting process is realized by the guidance of the shaft receiving portion and the bearing disk receiving portion with respect to each other, an additional precise alignment of the second pressing element to the bearing disk or the shaft would result in a redundant alignment of the two elements to each other and would thus only impair the guiding precision of the two elements with respect to each other in a negative way.

For this reason, it is preferable if the second pressing element is held on a base of the second pressing tool in a self-adjusting manner to the bearing disk or to the shaft. By arranging the second pressing element on the base of the second pressing tool in this way, any redundancy in the system is avoided, so that the second pressing element can adjust itself to the alignment of the shaft and bearing disk predetermined by the shaft receiving portion and the bearing disk receiving portion.

This means of self-adjustment of the second pressing element to the base of the second pressing tool can be realized in a variety of different ways, for example, by a cushion of a compressible or non-compressible medium.

A particularly simple solution provides that the second pressing element is supported on the base of the second pressing tool by an elastic spring and is in this way provided with the means of self adjustment.

Further characteristics and advantages of the invention form the subject matter of the description below as well as the illustration in drawings of an embodiment.

DETAILED DESCRIPTION OF THE INVENTION

Figure 1:
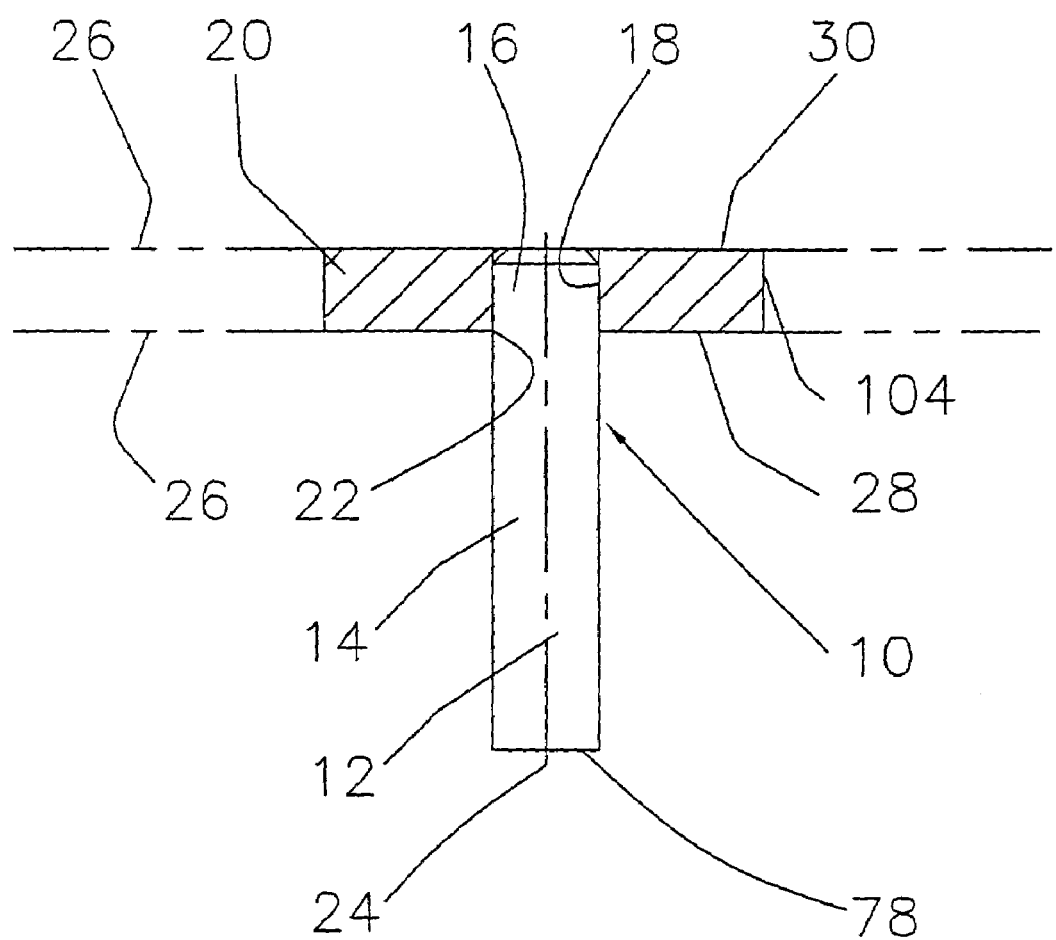
FIG. 1 a view of a shaft assembly for a hydrodynamic bearing which is to be manufactured using the device according to the invention.

A shaft assembly 10 for a hydrodynamic bearing of an electric spindle motor to be manufactured according to the invention comprises a shaft 12 which is ground on its peripheral face 14 and which is pressed at a pressfit end 16 into the fit bore 18 of a bearing disk 20 starting from an edge 22 of the fit bore 18, the fit bore 18 being formed, for example, as a through hole.

An essential feature of such a shaft assembly 10 is that the central axis 24 of the shaft assembly 10 runs exactly perpendicular to a first flat surface 28 of the bearing disk 20 extending in a plane 26 and also exactly perpendicular to a second flat surface 30 of the bearing disk 20 located opposite the first surface and also running parallel to the plane 26, since the first flat surface 28 and the second flat surface 30 of the bearing disk 20 are responsible for the axial journalling of the shaft assembly 10 in the hydrodynamic bearing.

In the devices known to date that are used to press a shaft 12 into the fit bore 18 of a bearing disk 20, shaft assemblies 10 can be produced which do not meet the accuracy requirements placed on right angularity and cylindricality.

This is due to an unsatisfactory alignment of the bearing disk 20 with respect to the flat surface 28 perpendicular to the central axis 24 and/or an unsatisfactory centering of the fit bore 18 with respect to the pressfit end 16. In both cases, local force peaks can occur during the pressfitting process due to one sided "touching", which, at worst, can result in the "seizing" of the parts that are to be joined, so that the shaft assembly 10 can be subject to intolerable deviations where the required right angularity, evenness and cylindricality are concerned.

Figure 2:
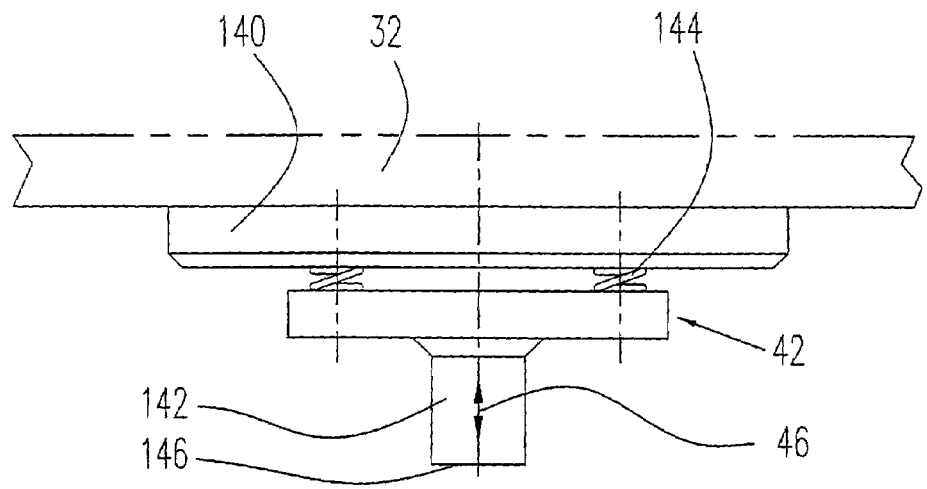
FIG. 2 a view of a first pressing tool and a second pressing tool of the device according to the invention and FIG. 3 an enlarged view of the first pressing tool.
Figure 2:
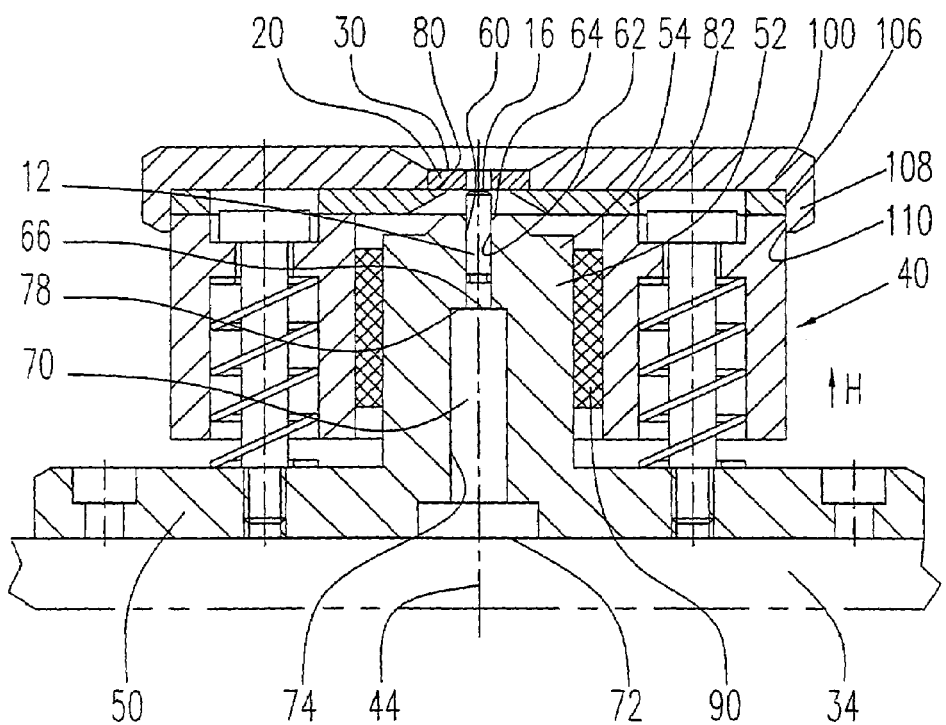
Figure 3:
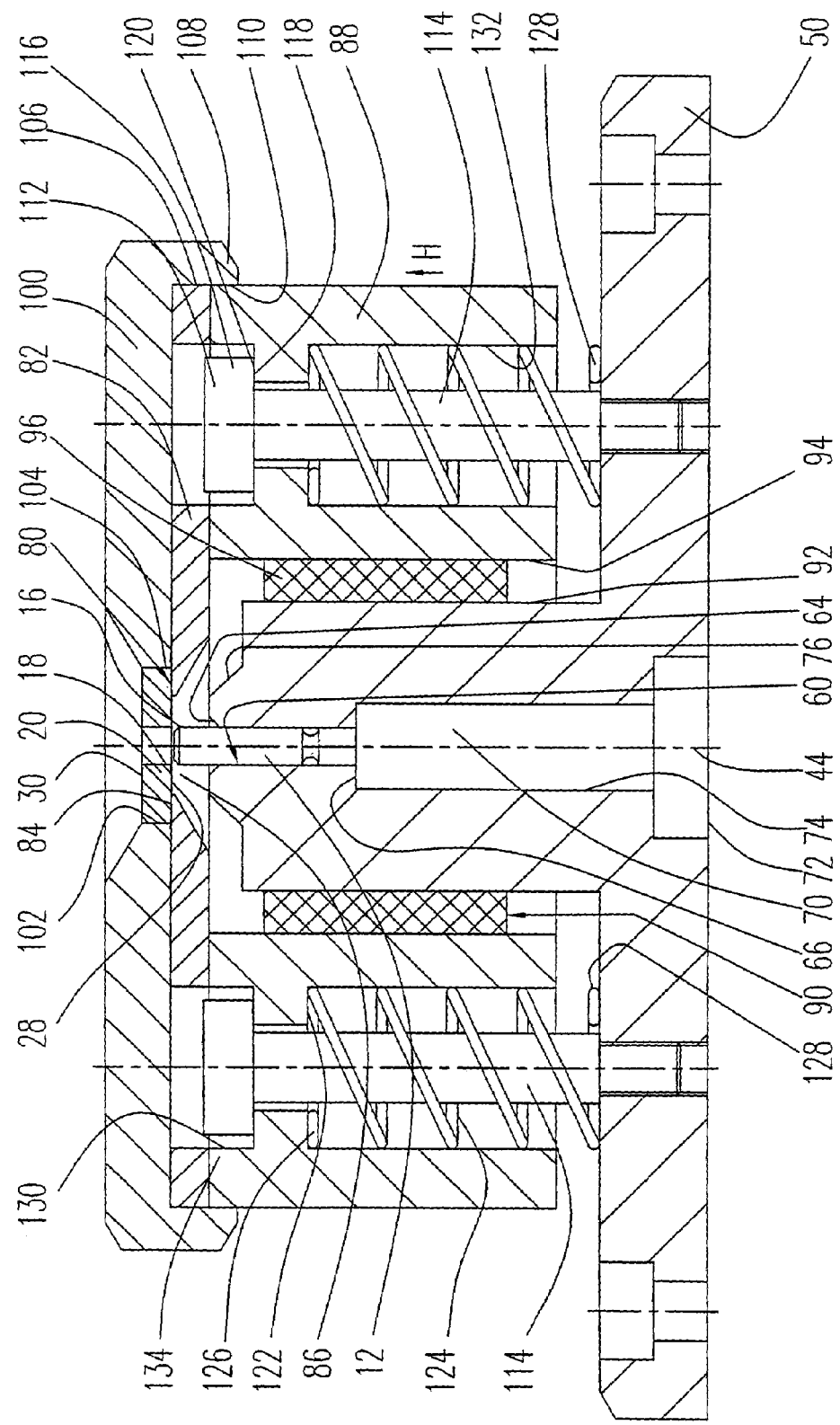

A device according to the invention as presented in FIGS. 2 and 3 is provided to avoid such problems.

As in a conventional pressing device, this device comprises a plunger 32 and a counter support 34 of the pressing device which can, for example, be pneumatically moved towards each other.

In the device according to the invention, a first pressing tool 40 is mounted on the counter support 34 and a second pressing tool 42 is mounted on the plunger 32, which are centered according to a common axis 44 which runs parallel to a direction of conveyance 46 along which the first pressing tool 40 and the second pressing tool 42 can be conveyed to each other.

The first pressing tool 40 includes a base 50, mounted on the counter support 34, carrying a column-shaped guide member 52 which is provided with a shaft receiving portion 60 in the region of an end 54 facing the second pressing tool 42 which, taking the form of a blind hole 62 extending into the guide member 52 from an opening 64 facing the second pressing tool 42, runs as far as a first pressing surface 66 formed by the end face of a first pressing element 70 which is supported on the counter support 34 by a lower side 72 located opposite the first pressing surface 66 and extends through the base 50 and the guide member 52 in a recess 74 reaching through the base 50 and the guide member 52 so that the first pressing surface 66 closes the shaft receiving portion 60 at a face of the shaft receiving portion 60 facing the counter support 34 and forms a supporting surface for an end face 78 of the shaft 12 located opposite the pressfit end 16 when the shaft 12 is inserted into the shaft receiving portion 60 (FIG. 2, 3).

The shaft receiving portion 60 is preferably designed in such a way that it centers the shaft 12 with its central axis 24 precisely coaxial to the axis 44 and thus also parallel to the direction of conveyance 46.

The guide member 52 preferably has a tapered outer surface 76 extending to the opening 64.

A bearing disk receiving portion, indicated in its entirety by 80, is provided to align the bearing disk 20, comprising, as shown in an enlarged view in FIG. 3, a bearing disk carrier 82 which is provided with a support surface 84 onto which the bearing disk 20 can be set with its lower flat surface 28.

The support surface 84 extends around a central recess 86 in the bearing disk carrier 82 by means of which the shaft 12 with its pressfit end 16 can be led through the bearing disk carrier 82 to be pressed into the fit bore 18.

For its part, the bearing disk carrier 82 is firmly connected to an annular member 88 which encloses the guide member 52 radially towards the outside and is guided along this guide member 52 by a linear guide, indicated in its entirety by 90, parallel to the axis 44.

The linear guide 90 is formed on the one hand by a guide surface 92 provided on the sleeve of the guide member 52 and a guide surface 94 of the annular member 88 facing this guide surface 92 as well as by a rolling element carrier 96, comprising rolling elements supported on both guide surfaces 92 and 94. The guide surfaces 92 and 94 are preferably cylindrical surfaces running coaxial to each other, and the rolling element carrier 96 includes rolling elements distributed over the two cylindrical guide surfaces 92 and 94 so that the linear guide 90 ensures high guiding precision for the movement of the annular member 88 in the direction of the axis 44 with respect to the guide member 52 and thus a high guiding precision for the movement of the bearing disk carrier 82 with the support surface 84 with respect to the shaft receiving portion 60.

The high guiding precision of the linear guide 90 thus enables the support surface 84 to be guided aligned exactly perpendicular with respect to the axis 44 and thus also the first flat surface 28 of the bearing disk 20 located on the support surface 84 exactly aligned to the central axis 24 of the shaft 12, when the bearing disk 20 is disposed in the bearing disk receiving portion 80 and the shaft 12 is disposed in the shaft receiving portion 60.

In order to further ensure that the bearing disk 20 is precisely centered with respect to the axis 44 and thus also with respect to the central axis 24 of the shaft 12, an aligning element, indicated in its entirety by 100 is provided on the bearing disk carrier 82, the aligning element 100 fitting snugly with its aligning surface 102 on an outer sleeve surface 104 of the bearing disk 20.

Moreover, the aligning element 100 extends away from the sleeve surface 104 only in a radial direction to the axis 44, so that the second flat surface 30 of the bearing disk 20 facing the second pressing tool 42 is freely exposed enabling a force to be exerted on it by the second pressing tool 42—as described in more detail below.

The aligning element 100 is preferably located on the bearing disk carrier 82 and overlaps an outer edge face 106 of the bearing disk carrier 82 with a collar 108, an inner surface 110 of the collar 108 being exactly positioned by the edge face 106 of the bearing disk carrier 82 in order to position the aligning element 100 for its part precisely to the bearing disk carrier 82. It is preferable if the aligning element 100 can be removed from the bearing disk carrier 82.

The movement of the bearing disk carrier 82 in the direction of the axis 44 by means of the linear guide 90 is restricted by stop elements 112 which comprise, for example, stay bolts 114 fixed into the base 50 that reach through the annular member 88 and have heads 116 which form annular surfaces 118 facing the base 50, against which the annular member 88 can rest with stop surfaces 120.

Pressure surfaces 122 located opposite the stop surfaces 120 are provided in the annular member 88 against which the pressure springs 124 enclosing the stay bolts 114 act with their ends 126, while the pressure springs 124 are supported on the base 50 by the ends 128 located opposite the ends 126.

The annular member 88 is preferably formed in such a way that it includes recesses 130 in which the heads 116 of the stay bolts 114 can be sunk and the annular member 88 is further preferably provided with recesses 132 extending from a side of the annular member 88 facing the base 50 by means of which the pressure springs 124 can extend into the annular member 88 as far as a collar 134 carrying the stop surfaces 120 and the pressure surfaces 122 and enclosing the stay bolts 114. Thus the pressure springs 124 act with holding force H in such a way that they have the tendency of always moving the bearing disk carrier 82 into the starting position and that a movement out of the starting position makes it necessary to overcome holding force H.

When the annular member 88 fits snugly with its stop surfaces 120 on the annular surfaces 118 of the heads 116 of the stay bolts 114, the bearing disk carrier 82 is in a starting position, as illustrated in FIGS. 2 and 3, in which the bearing disk 20 accommodated in the bearing disk receiving portion 18 is located close to the pressfit end 16 of the shaft 12 without, however, being in contact with the pressfit end 16.

The pressfit end 16 is now pressed into the fit bore 18 in that the first pressing tool 40 and the second pressing tool 42 are moved towards each other in the direction of conveyance 46. In order to act on the bearing disk 20, on the second flat surface 30 of the bearing disk 20 to be precise, the second pressing tool 42 is provided with a base 140 against which a second pressing element 142 is supported, by means of elastic spring elements 144 for example, in such a way that the second pressing element 142 can adjust itself with its second pressing surface 146, despite the exertion of a pressing force, with respect to the axis 44 corresponding to the alignment of the second flat surface 30, so that the alignment of the bearing disk 20 is in no way determined by the second pressing surface 146 when the pressfit end 16 is pressed into the fit bore 18, but rather that, with regard to its alignment to the axis 44, the second pressing surface 146 adjusts itself to the alignment of the bearing disk 20, determined by the bearing disk carrier 82.

By means of the second pressing surface 146 acting on the second flat surface 30 of the bearing disk 20, the bearing disk 20, together with the bearing disk carrier 82, is moved, overcoming holding force H, in the direction of the base 50 with respect to the guide member 52 into a pressing position, so that the pressfit end 16 of the shaft 12 penetrates beyond the edge 22 into the fit bore 18 and is fully pressed into the fit bore 18, until, for example, the pressfit end 16 of the shaft 12 is fully seated in the fit bore 18.

While the shaft end 16 is being pressed into the fit bore 18 on the one hand, the shaft 12, and thus the pressfit end 16 as well, is held by the shaft receiving portion 60 aligned exactly coaxial to the axis 44. Moreover, the bearing disk 20 is also held aligned by the bearing disk receiving portion 80, particularly the bearing disk carrier 82 with the support surface 84 pressing against the first flat surface 28 of the bearing disk 20 with holding force H, in such a way that the first flat surface 28 of the bearing disk 20 extends exactly perpendicular to the central axis 24 of the shaft 12. Furthermore, the bearing disk 20 with its fit bore 18 is also held by the aligning element 100, both before as well as during the pressfitting process, exactly centered to the central axis 24 of the pressfit end 16 and the shaft 12, the precision of the alignment of the fit bore 18 to the central axis 24 of the pressfit end 16 and the shaft 12 being realized through the guiding precision of the shaft receiving portion 60 with respect to the bearing disk receiving portion 80 via the linear guide 90, the linear guide 90 only needing to ensure the required guiding precision between the shaft receiving portion 60 and the bearing disk receiving portion 80 over a relatively short distance which is slightly larger than the thickness of the bearing disk 20.

IDENTIFICATION REFERENCE LIST

| | |
|---|---|
| 10 | Shaft assembly |
| 12 | Shaft |
| 14 | Peripheral face |
| 16 | Pressfit end |
| 18 | Fit bore |
| 20 | Bearing disk |
| 22 | Edge |
| 24 | Central axis |
| 26 | Plane |
| 28 | First flat surface |
| 30 | Second flat surface |
| 32 | Plunger |
| 34 | Counter support |
| 40 | First pressing tool |
| 42 | Second pressing tool |
| 44 | Axis |
| 46 | Direction of conveyance |
| 50 | Base |
| 52 | Guide member |
| 54 | End |
| 60 | Shaft receiving portion |
| 62 | Blind hole |
| 64 | Opening |
| 66 | First pressing surface |
| 70 | First pressing element |
| 72 | Lower side |
| 74 | Recess |
| 76 | Outer surface |
| 78 | End face |
| 80 | Bearing disk receiving portion |
| 82 | Bearing disk carrier |
| 84 | Support surface |
| 86 | Recess |
| 88 | Annular member |
| 90 | Linear guide |
| 92 | Guide surface |
| 94 | Guides |
| 96 | Rolling element carrier |
| 100 | Aligning element |
| 102 | Aligning surface |
| 104 | Sleeve surface |
| 106 | Edge face |
| 108 | Collar |
| 110 | Inner surface |
| 112 | Stop element |

-continued

IDENTIFICATION REFERENCE LIST

| | |
|---|---|
| 114 | Stay bolts |
| 116 | Heads |
| 118 | Annular surface |
| 120 | Stop surfaces |
| 122 | Pressure surfaces |
| 124 | Pressure springs |
| 126 | End |
| 128 | End |
| 130 | Recess |
| 132 | Recess |
| 134 | Collar |
| 140 | Base |
| 142 | Second pressing element |
| 144 | Elastic spring element |
| 146 | Second pressing surface |
| H | Holding force |

The invention claimed is:

1. A device for the manufacture of a shaft assembly for a hydrodynamic bearing by pressing a shaft into a fit bore in a bearing disk, the device comprising:
a first pressing tool,
a second pressing tool,
the first pressing tool and the second pressing tool being adapted to be moved towards each other in a feed direction,
a shaft receiving portion which receives and guides the shaft aligned exactly to a central axis being associated with the first pressing tool,
a bearing disk receiving portion which receives and guides the bearing disk with a first flat surface aligned exactly perpendicular to the axis associated with first pressing tool,
the shaft receiving portion and the bearing disk receiving portion positioning the shaft and the bearing disk with respect to each other without contact in a starting position,
the shaft receiving portion and the bearing disk receiving portion being movably guidable with respect to each other parallel to the axis via a linear guide and are movable from the starting position into a pressfit position, the linear guide being supported by rolling element bearings, and
for pressfitting the shaft and the bearing disk, the first pressing tool acting on one of the shaft or the bearing disk by means of a first pressing element and a second pressing tool acting on the other of the bearing disk or the shaft by means of a second pressing element.

2. A device according to claim 1, wherein during the pressfitting, when movement from the starting position in the direction of the pressfit position begins, only the bearing disk receiving portion and the shaft receiving portion maintain the exact alignment of the shaft and the bearing disk with respect to each other.

3. A device according to claim 1, wherein the bearing disk receiving portion comprises a bearing disk carrier having a support surface against which the bearing disk engages with the first flat surface.

4. A device according to claim 3, wherein, at least from a start of the pressfitting of the shaft into the bearing disk, the first flat surface of the bearing disk is held in close contact with the support surface.

5. A device according to claim 4, wherein the support surface is held tightly to the first flat surface by a holding force.

6. A device according to claim 4, wherein the holding force acts in a direction of the starting position and is exerted on the bearing disk receiving portion and the shaft receiving portion in respect of a relative movement in the direction of the axis and wherein the holding force works against a direction of conveyance of the pressing elements.

7. A device according to claim 5, wherein the holding force is generated by at least one elastic energy or force storage unit.

8. A device according to claim 1, wherein a force can be applied by the second pressing element of the second pressing tool to a second flat surface located opposite the first flat surface of the bearing disk held in the bearing disk receiving portion.

9. A device according to claim 1, wherein the bearing disk receiving portion centers the bearing disk precisely to the axis.

10. A device according to claim 9, wherein the bearing disk receiving portion is provided with an aligning element that holds the bearing disk centered with respect to the axis.

11. A device according to claim 10, wherein the aligning element engages an outer surface of the bearing disk.

12. A device according to claim 10, wherein the aligning element is secured to a bearing disk carrier.

13. A device according to claim 12, wherein the aligning element is secured to the bearing disk carrier in a positive fit.

14. A device according to claim 12, wherein the aligning element can be removed from the bearing disk carrier.

15. A device according to claim 1, wherein the second pressing element is held on a base of the second pressing tool in a self-adjusting manner to the bearing disk or to the shaft.

16. A device according to claim 15, wherein the second pressing element is supported on the base of the second pressing tool by an elastic spring.

17. A device for the manufacture of a shaft assembly for a hydrodynamic bearing by pressing a shaft into a fit bore in a bearing disk, the device comprising:
   a first Pressing tool,
   a second pressing tool,
   the first pressing tool and the second pressing tool being adapted to be moved towards each other in a feed direction,
   a shaft receiving portion which receives and guides the shaft aligned exactly to a central axis being associated with the first pressing tool,
   a bearing disk receiving portion which receives and guides the bearing disk with a first flat surface aligned exactly perpendicular to the axis associated with first pressing tool,
   the shaft receiving portion and the bearing disk receiving portion positioning the shaft and the bearing disk with respect to each other without contact in a starting position and the shaft receiving portion and the bearing disk receiving portion being movably guidable with respect to each other parallel to the axis via a linear guide and movable from the starting position into a pressfit position,
   for pressfitting the shaft and the bearing disk, the first pressing tool acting on one of the shaft or the bearing disk by means of a first pressing element and a second pressing tool acting on the other of the bearing disk or the shaft by means of a second pressing element, and
   a guide member carrying the shaft receiving portion forming a first guide surface for the linear guide.

18. A device for the manufacture of a shaft assembly for a hydrodynamic bearing by pressing a shaft into a fit bore in a bearing disk, the device comprising:
   a first Pressing tool,
   a second Pressing tool.
   the first pressing tool and the second pressing tool being adapted to be moved towards each other in a feed direction,
   a shaft receiving portion which receives and guides the shaft aligned exactly to a central axis being associated with the first pressing tool,
   a bearing disk receiving portion which receives and guides the bearing disk with a first flat surface aligned exactly perpendicular to the axis associated with first pressing tool,
   the shaft receiving portion and the bearing disk receiving portion positioning the shaft and the bearing disk with respect to each other without contact in a starting position and the shaft receiving portion and the bearing disk receiving portion being movably guidable with respect to each other parallel to the axis via a linear guide and movable from the starting position into a pressfit position,
   for pressfitting the shaft and the bearing disk, the first pressing tool acting on one of the shaft or the bearing disk by means of a first pressing element and a second pressing tool acting on the other of the bearing disk or the shaft by means of a second pressing element, and
   an annular member carrying the bearing disk receiving portion which encloses a guide member and has a second guide surface facing a first guide surface.

* * * * *